US 6,670,055 B2

(12) United States Patent
Tomiyasu et al.

(10) Patent No.: US 6,670,055 B2
(45) Date of Patent: Dec. 30, 2003

(54) MAGNETIC RECORDING MEDIUM AND MANUFACTURING METHOD THEREFOR

(75) Inventors: Hiroshi Tomiyasu, Tokyo (JP); Junichi Horikawa, Tokyo (JP); Teiichiro Umezawa, Tokyo (JP); Kenji Ayama, Tokyo (JP); Tomotaka Yokoyama, Tokyo (JP)

(73) Assignee: Hoya Corporation (JP)

( * ) Notice: Subject to any disclaimer, the term of this patent is extended or adjusted under 35 U.S.C. 154(b) by 14 days.

(21) Appl. No.: 09/925,573

(22) Filed: Aug. 9, 2001

(65) Prior Publication Data

US 2002/0119350 A1 Aug. 29, 2002

(30) Foreign Application Priority Data

Aug. 14, 2000 (JP) ........................... 2000-245977

(51) Int. Cl.[7] .............. G11B 5/66; G11B 5/70; H01J 1/00
(52) U.S. Cl. ............... 428/694 TS; 428/611; 428/666; 428/900
(58) Field of Search .............. 428/694 TS, 900, 428/611, 666

(56) References Cited

U.S. PATENT DOCUMENTS

| | | | |
|---|---|---|---|
| 5,700,593 A | * 12/1997 | Okumura et al. | 428/694 TS |
| 6,218,028 B1 | * 4/2001 | Song et al. | 428/611 |
| 6,416,881 B1 | * 7/2002 | Huang et al. | 428/611 |
| 6,553,788 B1 | * 4/2003 | Ikeda et al. | 65/31 |

FOREIGN PATENT DOCUMENTS

JP 11-094391 10/2000

OTHER PUBLICATIONS

English abstract of JP 11-094391.

* cited by examiner

*Primary Examiner*—Holly Rickman
(74) *Attorney, Agent, or Firm*—Cook, Alex, McFarron, Manzo, Cummings & Mehler, Ltd.

(57) ABSTRACT

A magnetic recording medium that is high coersive force, hard to receive influence of thermal fluctuation, and brings about a considerable improvement of S/N ratio, and in which at least an underlayer and a magnetic layer are sequentially laminated on a substrate, wherein a pre-coat layer is interposed between said underlayer and said substrate and said pre-coat layer is constructed by sequentially laminating a lower layer containing Ni and P and an upper layer made of a Cr alloy.

9 Claims, 6 Drawing Sheets

MAGNETIC RECORDING MEDIUM AND MANUFACTURING METHOD THEREFOR

REFERENCE TO RELATED APPLICATION

This application claims the priority right under Paris Convention of Japanese Patent Application No. 2000-245977 filed on Aug. 14, 2000, the entire disclosure of which is incorporated herein by reference.

BACKGROUND OF THE INVENTION (i) Field of the Invention

The present invention relates to magnetic recording media such as hard disks incorporated in external storage devices of computers, particularly to magnetic recording media with high coersive force and low noise in which a pre-coat layer for decrease in size of crystal grains of an underlayer and a magnetic layer and for suppressing dispersion of grain size of an underlayer and a magnetic layer is provided between a substrate and the underlayer, and manufacturing methods thereof.

(ii) Description of the Related Art

As a magnetic recording medium of this kind, for example, a magnetic recording medium as described in the specification of Japanese Patent Application No. 11-094391, which is a prior application of the present applicant, has been proposed. This magnetic recording medium is constructed by sequentially laminating, on a substrate, a seed layer in which an intermediate layer is interposed between at least two or more layers of non-magnetic films, a Cr or Cr-alloy underlayer, a Co-alloy magnetic layer, and attains high coersive force and low noise.

The high coersive force of this magnetic recording medium is attained by the manner that the seed layer enhances the crystal orientation of (110) plane in the body center cubic (bcc) of the Cr or Cr-alloy as the underlayer, and the crystal orientation of (100) plane in which the magnetization easy axis (c axis) of the Co magnetic layer epitaxial-grown thereon becomes parallel in plane is improved.

Besides, in this magnetic recording medium, since the film thickness of the underlayer can be thinned by providing the seed layer, by thinning the underlayer, Co magnetic grains thereon are made fine, and since the magnetization transition region (magnetic wall width) between recording bits can be decreased, noise can be reduced.

SUMMARY OF THE INVENTION

In recent years, development of magnetic recording media in which noise is reduced attendant upon still higher recording density of magnetic recording media and S/N ratio is improved is desired.

Although the crystal grain diameter of the magnetic layer must be decreased as fine as possible, if the crystal grain diameter of the magnetic layer is made very fine, there is a problem that a phenomenon in which the magnetization becomes thermally unstable, the recorded signal is attenuated with time, and finally the recorded signal disappears, that is, a phenomenon called thermal fluctuation occurs. Noise and thermal fluctuation are in relation of trade-off, and as the crystal grain diameter of the magnetic layer is decreased, although noise is reduced, the signal attenuation by the thermal fluctuation becomes large, and the recorded signal becomes easy to be attenuated with time or disappear. If the thermal fluctuation occurs, other than the signal attenuation (reduction of reproduction output), medium noise increases and the value of PW50 value (half pulse width of isolated reproduction signal) is deteriorated.

As a fine structure of a medium desired for high-density recording, it has become impossible that, as well as decreasing the crystal grains of the magnetic layer, the dispersion of grain size (grain diameter distribution) is decreased and generation of excessively fine grains apt to receive influence of thermal fluctuation is suppressed.

Because the crystal structure of the magnetic layer is obtained by taking over the crystal structure of the underlayer, as well as making the crystal grains of the underlayer still finer, the grain diameter distribution must be made small.

The present inventor and so on have made the present invention as a result of repeating earnest examination based on knowledge whether or not decrease in crystal grain of the magnetic layer and improvement of the dispersion of grain size can be intended by interposing a pre-coat layer between a substrate and the underlayer.

Accordingly, it is an object of the present invention to provide magnetic recording media with high coersive force, hard to receive the influence of thermal fluctuation, and bringing about considerable improvement of S/N ratio.

The present invention has the following constitutions.

Constitution 1

A magnetic recording medium in which at least an underlayer and a magnetic layer are sequentially formed on a substrate, wherein a pre-coat layer for decrease in size of crystal grains of the underlayer and magnetic layer and for suppressing dispersion of grain size of the underlayer and magnetic layer is interposed between said substrate and the underlayer, and in said pre-coat layer, a lower layer containing Ni and P and an upper layer made of a Cr alloy are sequentially laminated from said substrate side.

Constitution 2

The magnetic recording medium according to construction 1, wherein the crystal structure of said pre-coat layer is an amorphous structure or an almost amorphous structure.

Constitution 3

The magnetic recording medium according to constitution 1 or 2, wherein said pre-coat layer contains nitrogen.

Constitution 4

The magnetic recording medium according to constitution 3, wherein said nitrogen is contained at 1 to 20 at %.

Constitution 5

The magnetic recording medium according to any one of constitutions 1 to 4, wherein said upper layer is a Cr alloy containing Cr and one of Zr and W.

Constitution 6

The magnetic recording medium according to any one of constitutions 1 to 5, wherein a seed layer for controlling the crystal grain diameter of the underlayer and magnetic layer is formed between said pre-coat layer and the underlayer.

Constitution 7

The magnetic recording medium according to any one of constitutions 1 to 6, wherein the film thickness of said lower layer is 50 to 2000 Å.

Constitution 8

The magnetic recording medium according to any one of constitutions 1 to 7, wherein the film thickness of said upper layer is 5 to 300 Å.

Constitution 9

The magnetic recording medium according to any one of constitutions 1 to 8, wherein said substrate is a glass substrate.

Constitution 10

The magnetic recording medium according to any one of constitutions 1 to 9, wherein said magnetic recording medium is used under conditions of a linear recording density of 300 kfci or more.

Constitution 11

A manufacturing method of a magnetic recording medium made by sequentially forming at least an underlayer and a magnetic layer on a substrate by sputtering, wherein a pre-coat layer having a lower layer containing Ni and P and an upper layer made of a Cr alloy is sequentially formed by sputtering between said substrate and the underlayer.

Constitution 12

The manufacturing method of a magnetic recording medium according to constitution 11, wherein said pre-coat layer is sputtered in a mixture gas atmosphere containing an inert gas and nitrogen.

Constitution 13

The manufacturing method of a magnetic recording medium according to constitution 12, wherein the content of nitrogen contained in the mixture gas is set at 20 to 80%.

Constitution 14

The manufacturing method of a magnetic recording medium according to any one of constitutions 11 to 13, wherein said substrate is a glass substrate.

According to the above constitution 1, the pre-coat layer is constituted by the lower layer containing Ni and P and the upper layer made of the Cr alloy. The layer of the lower layer containing Ni and P has a role for interrupting organic pollution substances on the substrate surface or alkali impurities immersed out from the substrate, and a role for canceling (interrupting a film formed thereon so as not to influence the crystal growth) a surface state (such as the crystal structure) of the substrate surface. To the layer of the lower layer containing Ni and P, another element can be added without departing from the above effect. For example, Al, B, Zr, Ti, or the like, can be mentioned. The contents of these elements are preferably suppressed to 50 at % or less. Besides, the content of P (phosphorus) contained in the lower layer is preferably 10 to 30 at % for having the above effect.

The layer of the upper layer made of the Cr alloy has a work of an initial growth film of a film formed thereon. To have the work of the initial growth film, as an element added to Cr, at least one selected out of Zr, Nb, W, V, Ti, Mo, Ta, Ni, and Hf can be selected. The material containing Cr and the above element can obtain a fine crystal grain diameter and has a nature that the grain diameter distribution becomes very small. Accordingly, with avoiding an influence of thermal fluctuation, S/N ratio can be considerably improved as about 2 to 4 dB, and an improvement of PW 50 value (half pulse width of isolated reproduction signal) can be intended. Like the above description, to the Cr alloy of the upper layer, another element can be added without departing from the above effect. For example, B, C, O, or the like can be mentioned. The contents of these elements are preferably suppressed to 10 at % or less. Besides, the above element (at least one element selected out of Zr, Nb, W, V, Ti, Mo, Ta, Ni, and Hf) contained in the upper layer is preferably 10 to 50 at % for having the above effect.

Besides, the above pre-coat layer is important to have a laminate structure of the lower layer and the upper layer, and if it is a single layer of the lower layer, S/N ratio is improved by only about 0.8 dB, and if it is a single layer of the upper layer, it is improved by only about 0.3 dB, but by making a laminate structure of the lower layer and the upper layer, a considerable improvement of about 2 to 4 dB can be obtained.

Besides, in the above pre-coat layer, a middle layer may be provided between the lower layer and the upper layer if it is within a range without departing from the considerable improvement effects of these S/N ratios.

As in the above constitution 2, the crystal structure of said pre-coat layer is an amorphous or an almost amorphous structure. Here, an amorphous, an almost amorphous structure indicate a state that there is no definite X-ray diffraction peak or the X-ray diffraction peak is extremely broad when measuring with an X-ray diffract meter. To obtain such a crystal structure, nitrogen is contained in the pre-coat layer (lower layer, upper layer). Nitrogen has a work for make crystal grains fine, and a role for drawing out the above effect. The content of nitrogen contained in the pre-coat layer is preferably 1 to 20 at %. In case of less than 1 at %, since the effect of decrease in size is eliminated, it is undesirable, and if it exceeds 20 at %, since the film deposition (sputtering) speed is remarkably lowered, it is undesirable, and preferably, it is desirable to be 3 to 20 at %.

Incidentally, the deposition method of the pre-coat layer is not particularly limited. For example, a sputtering method, a vacuum vapor deposition method, a CVD method, or the like can be mentioned.

Besides, as in the above constitution 5, by setting the Cr alloy of the upper layer to a material containing Cr and one of Zr and W, since decrease in size of crystal grains and uniformization of grain diameter can be further intended, it is preferable on the point of noise reduction, improvement of PW 50 value, and resistivity of thermal fluctuation.

Besides, as in the above constitution 6, by forming the seed layer for controlling the crystal grain diameter of the underlayer and magnetic layer between the pre-coat layer and the underlayer, the uniformization of crystal grain diameter is further promoted, and since S/N ratio and resistivity of thermal fluctuation are improved, it is desirable. There is not particularly a limit in the material of the seed layer. For example, NiAl, AlCo, FeAl, FeTi, CoFe, CoTi, CoHf, CoZr, NiTi, CuZn, AlMn, AlRe, AgMg, CuSi, NiGa, CuBe, MnV, NiZn, FeV, CrTi, CrNi, NiAlRu, NiAlW, NiAlTa, NiAlHf, NiAlMo, NiAlCr, NiAlZr, NiAlNb, $Al_2FeMn_2$, or the like can be mentioned.

Besides, as in the above constitution 7, the film thickness of the lower layer is preferably set at 50 to 2000 Å. More preferably, it is desirable to set at 300 to 1500 Å. In case of less than 50 Å, it is undesirable because it is influenced by pollution substances of the substrate surface, and the effect of canceling (interrupting a film formed thereon so as not to influence the crystal growth) a surface state (such as the crystal structure) of the substrate surface is eliminated, and uniformization of crystal grain diameter distribution of the initial growth film of the upper layer is not obtained, and if it exceeds 2000 Å, it is undesirable because the crystal grain diameter of the lower layer becomes large, and by influence of it, also the crystal grain diameter of the magnetic layer becomes large, and S/N ratio is lowered. Besides, because the film stress of NiP becomes large, and the adhesion strength of the upper layer is lowered, it is undesirable. The relation between the film thickness and S/N ratio has a peak of S/N ratio between 300 to 1500 Å though the peak of S/N ratio changes by the material of the magnetic layer.

Besides, as in constitution 8, the film thickness of the upper layer is preferably set at 5 to 300 Å. More preferably, it is desirable to set at 15 to 200 Å. In case of less than 5 Å, it is undesirable because the film is extremely thin and the effect of the above-described upper layer does not act, and if it exceeds 300 Å, it is undesirable because the crystal grain diameter becomes large, and by influence of it, also the crystal grain diameter of the magnetic layer becomes large, and S/N ratio is lowered. The relation between the film thickness and S/N ratio has a peak of S/N ratio in the vicinity of 30 Å irrespective of the material of the magnetic layer.

Besides, in the magnetic recording medium of the above-described present invention, there is not particularly a limit in the material of the substrate. For example, a glass substrate (including a crystallized glass substrate), an aluminum alloy substrate, a ceramics substrate, a carbon substrate, a silicon substrate, or the like can be used. Among them, as in the constitution 9, in case that the substrate material is a glass substrate (including a crystallized glass substrate), since glass has an amorphous structure, the affinity with the film containing Ni and P of the amorphous structure of the lower layer is good, and the segregation of crystal with Ni and P is eliminated. As the glass kind of the glass substrate, aluminosilicate glass, soda lime glass, aluminoporosilicate glass, porosilicate glass, crystallized glass, quartz glass, or the like can be mentioned.

Besides, as in the constitution 10, the magnetic recording medium of the present invention is particularly useful in case of being used under conditions of a linear recording density of 300 kfci or more. To make the magnetic recording medium higher density, it is in general to raise the linear recording density and the track recording density. In recent years that higher density recording and reproduction are required, it is very meaningful that it is a medium (magnetic disk) with high linear recording density and good characteristics, and the magnetic recording medium of the present invention particularly shows an effect in an environment of using in high density recording and reproduction of such a linear recording density of 300 kfci.

Besides, as in the constitution 11, the manufacturing method of a magnetic recording medium of the present invention is a manufacturing method of a magnetic recording medium made by sequentially forming at least an underlayer and a magnetic layer on a substrate by sputtering, wherein a pre-coat layer having a lower layer containing Ni and P and an upper layer made of a Cr alloy is sequentially formed by sputtering between said substrate and the underlayer. By forming the pre-coat layer by sputtering, it is because an amorphous phase containing high purity Ni and P can be formed with a uniform film thickness. As for conditions (substrate temperature, gas pressure, film deposition time, and so on) upon sputtering, it is performed with being properly adjusted.

Besides, as in the constitution 12, by sputtering the pre-coat layer in the mixture gas atmosphere containing an inert gas and nitrogen gas, nitrogen can uniformize with decrease in size of crystal grain diameter of the pre-coat layer. Within a range without departing from the effect of the present invention, other than the inert gas (Ar, He, Kr, or the like) and nitrogen gas, a reactive gas (for example, oxygen, hydrogen, or the like) may be contained. The content of nitrogen contained in the mixture gas is preferably set at 20 to 80%. More preferably, it is desirable to set at 30 to 60%. In case of less than 20%, it is undesirable because the crystal grain diameter can not made fine, and if it exceeds 80%, it is undesirable because it becomes reduction of remarkable sputtering rate, reduction of coersive force by turning in of nitrogen to another layer, and aggravation of PW 50 value. Incidentally, in the vicinity of the content of nitrogen of 50%, the PW 50 value and the value of S/N ratio have optimal values.

Besides, for the above-described reason, the material of the substrate is preferably a glass substrate.

In the above recording medium of the present invention, the underlayer and the magnetic layer are not particularly limited.

The underlayer is formed for the purpose of improving the magnetic characteristics, and in case of the magnetic layer containing Co as the main ingredient, Cr single body or a Cr alloy is used. As the Cr alloy, CrV, CrW, CrMo, CrTi, or the like can be mentioned. The underlayer may be either of a singly layer and a plurality of layers.

As the magnetic layer, for example, a magnetic layer containing Co as the main ingredient such as CoPt, CoCr, CoNi, CoNiCr, CoCrTa, CoPtCr, CoNiPt or CoNiCrPt, CoNiCrTa, CoCrPtTa, CoCrPtB, CoCrPtTaNb, CoCrPtTaB, or the like can be mentioned. The magnetic layer may be a multilayer constitution (for example, CoCrPtTa/CrMo/CoCrPtTa or the like) in which noise reduction is intended by dividing a magnetic film by a non-magnetic film (for example, Cr, CrMo, CrV, CrMnC, or the like), or a laminate structure in which the magnetic film is directly formed without interposing the non-magnetic film.

As the magnetic layer to cope with a magnetoresistive head (MR head) or a giant (large) magnetoresistive head (GMR head), a Co-base alloy containing an impurity element selected out of Y, Si rare earth element, Hf, Ge, Sn, and Zn, or oxides of these impurity elements, or the like is included. Besides, as the magnetic layer, other than the above, it may be ferrite-base, iron-rare earth-base, or granular in which magnetic grains of Fe, Co, FeCo, CoNiPt, or the like are dispersed in a non-magnetic film made of $SiO_2$, BN, or the like. Besides, the magnetic layer may be either of recording forms of in-plane type and perpendicular type.

Besides, an intermediate layer for controlling the crystal orientation of the magnetic layer may be formed between the underlayer and the magnetic layer. As the intermediate layer, CoCr, CoCrNb, or the like can be mentioned.

On the magnetic layer, at need, a protective layer or a lubricating layer can be formed.

The protective layer is formed for the purpose of protecting the magnetic layer from being destroyed due to contact slide of a magnetic head. The protective layer can be formed from one layer or two layers or more. As the protective layer, a chromium film, a silicon oxide film, a carbon film, a hydrogenated carbon film, a nitrogenated carbon film, a hydro-, nitrogenated carbon film, a zirconia film, a silicon nitride film, a silicon carbide film, or the like can be mentioned. Incidentally, the protective film can be formed by a know film formation method such as a sputtering method or the like.

The lubricating layer is formed for the purpose of reducing the friction by contact slide with the magnetic head, and for example, perfluoropolyether or the like as a liquid lubricating agent is generally used.

DETAILED DESCRIPTION OF THE PREFERRED EMBODIMENTS

Hereinafter, the magnetic recording medium of the present invention will be described in more detail using embodiments.

Embodiment 1

Figure 1:
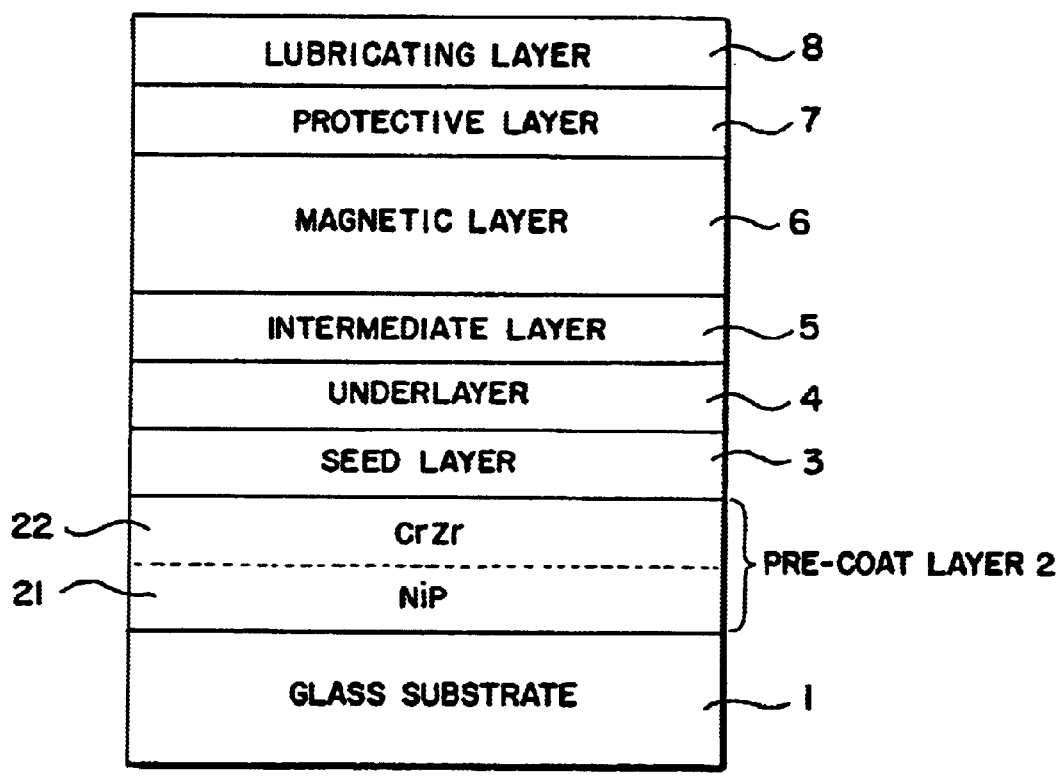
FIG. 1 is a view typically showing a sectional structure of a magnetic recording medium according to the present invention.

As shown in FIG. 1, the magnetic recording medium of this embodiment is a magnetic disk in which a pre-coat layer 2, a seed layer 3, an underlayer 4, an intermediate layer 5, a magnetic layer 6, a protective layer 7, and a lubricating layer 8 are sequentially laminated on a glass substrate 1.

The glass substrate 1 is made of chemically strengthened aluminosilicate glass whose surface roughness is mirror-polished with Rmax=3.2 nm and Ra=0.3 nm.

The pre-coat layer 2 is constituted by two layers of alloy films 21 and 22, in which the alloy film 21 of the lower layer is made of a nitride film (film thickness: 300 Å) of NiP and the alloy film of the upper layer is made of a nitride film (film thickness: 30 Å) of CrZr. The atomic composition ratio of Ni to P in the alloy film 21 is 80:20. The atomic composition ratio of Cr to Zr in the alloy film 22 is 60:40 (embodiment 1) or 80:20. The content of nitrogen contained in the alloy films 21 and 22 is 4 at % (ESCA analysis value).

The alloy film 21 and the alloy film 22 are sequentially formed by sputtering in a mixture gas atmosphere of Ar:50% and $N_2$:50%, respectively.

After the substrate 1 is heated at 200° C., the alloy films 21 and 22 are sequentially formed by sputtering under preheat. Incidentally, if the temperature is raised to 220° C. or more upon heating the substrate, since NiP is magnetized and becomes a noise source, the temperature management is important.

Incidentally, part of P of the alloy film 21 can be replaced by Al to be $NiP_{1-x}Al_x$. Besides, in place of Zr of the alloy film 22, W, Nb, or Hf may be used.

Besides, upon manufacturing the alloy films 21 and 22, a DC substrate bias of −200 V to −300 V may be applied to the substrate 1.

Further, the substrate 1 is not limited to an isotropic substrate, and it may have anisotropy in a circumferential direction.

The seed layer 3 is formed by an NiAl thin film after the substrate 1 is again heated at 200° C. The NiAl thin film is constructed with a composition ratio of Ni: 50 at % and Al: 50 at %.

The underlayer 4 is a CrV thin film (film thickness: 100 Å) and provided for making the crystal structure of the magnetic layer good. This CrV thin film is constructed with a composition ratio of Cr: 80 at % and V: 20 at %.

Besides, the intermediate layer 5 is a CoCr thin film (film thickness: 30 Å) and provided for making the orientation of C axis of the magnetic layer good. Incidentally, this CoCr thin film is a non-magnetic film having an HCP crystal structure with Co: 65 at % and Cr: 35 at %.

The magnetic layer 6 is a CoCrPtB alloy thin film (film thickness: 200 Å) and the contents of Co, Cr, Pt, and B are Co: 62 at %, Cr: 20 at %, Pt: 12 at %, and B: 6 at %.

The protective layer 7 is for preventing the magnetic layer 6 from deteriorating by contact with a magnetic head, and made of a hydrogenated carbon film with a film thickness of 45 Å.

The lubricating layer 8 is made of a liquid lubricating agent of perfluoropolyether, and by this film, contact with the magnetic head is relieved. Incidentally, the film thickness is 8 Å.

Next, a manufacturing method of the magnetic disk having the above-described constitution will be described.

First, a main surface of the glass substrate 1 chemically strengthened by ion exchange is made a mirror surface (Rmax=3.2 nm, Ra=0.3 nm) by precise polishing. Next, on the main surface of this glass substrate 1, by sputtering of inline method, the pre-coat layer 2, the seed layer 3, the underlayer 4, the intermediate layer 5, the magnetic layer 6, and the protective layer 7 were sequentially formed. Next, by dip-processing the liquid lubricating agent made of perfluoropolyether on the protective layer 7, the lubricating layer 8 is formed, thereby obtaining the magnetic disk.

As a result of measuring S/N ratio and PW 50 value (half pulse width of isolated reproduction signal) of this obtained magnetic disk, S/N ratio and PW 50 value were good as 27.44 dB and 12.97 nsec. The larger S/N ratio is preferable because of the smaller noise, and for example, it is said that if it differs by about 0.5 dB, there is a difference of about 0.6 Gb/inch$^2$ in recording density. The smaller PW 50 value (half pulse width of isolated reproduction signal) value is preferable, and it is said that if it differs by about 0.6 nsec, there is a difference of about 0.8 Gb/inch$^2$ in recording density.

Incidentally, S/N ratio and PW 50 value were measured by the following methods.

S/N ratio was obtained by performing the measurement of a recording reproduction output as follows. Using a giant magnetoresistive type head (hereinafter referred to as GMR head) whose magnetic head flying height value was 0.02 μm, by setting the relative speed between the GMR head and the magnetic disk at 10 m/sec, a recording reproduction output in a linear recording density of 426 kfcl (linear recording density of 426000 bits per inch) was measured. Besides, by setting the measurement band to 98.76 MHz at a carrier frequency of 82. 3 MHz, by a spectrum analyzer, a noise spectrum upon signal recording/reproducing was measured. An MR head used in this measurement had track widths of 0.85/0.6 μm and magnetic head gap lengths of 0.25/0.14 μm on rite/read sides, respectively.

The measurement of PW 50 value (half pulse width of isolated reproduction signal) was performed as follows. An isolated reproduction signal is extracted by an electromagnetic transformation characteristic measurement instrument (GUZIK) mounted thereon an MR head for measuring PW 50 value, and the width of an isolated waveform at 50% of a peak value of an output signal to ground (0) was considered PW 50 value. Incidentally, for high recording density, the smaller this PW 50 value is, the more desirable it is. This is because, if the pulse width is narrow, more pulses (signals) can be written in on the same area. On the other hand, if PW 50 value is large, neighboring pulses (signals) are interfered with each other and it appears as an error when the signals are read out. This waveform interference makes the error rate bad. From these, PW 50 value must be set at 19.2 nsec or less.

Embodiments 2 and 3

Figure 2:
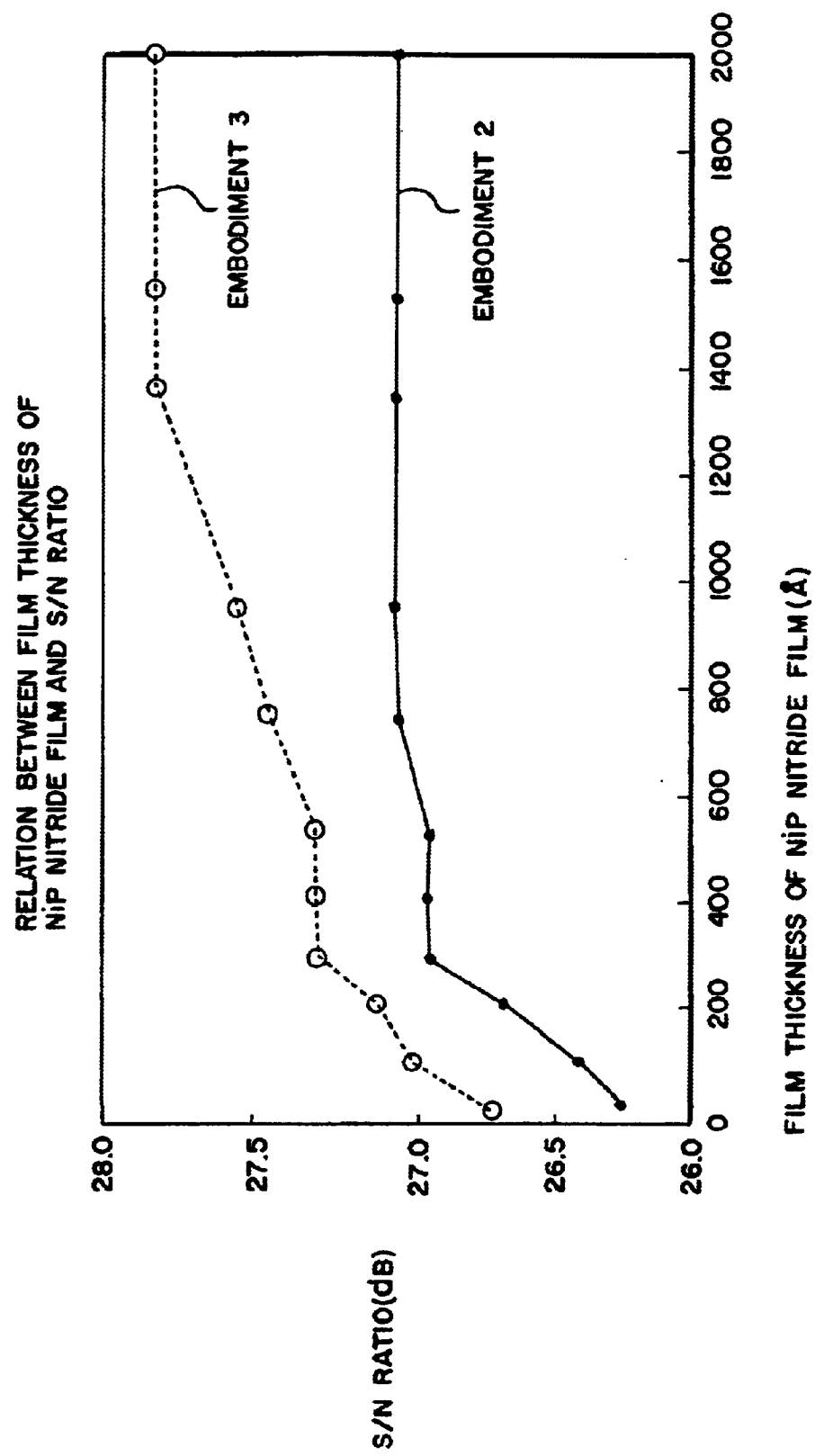
FIG. 2 is a graph showing the relation between the thickness of the lower layer of the pre-coat layer and S/N ratio.

Using as embodiment 2 that the magnetic layer 6 was Co: 62 at %, Cr: 20 at %, Pt: 12 at %, and B: 6 at %, and as embodiment 3 that it was Co: 61.5 at %, Cr: 20 at %, Pt: 12 at %, Ta: 0.5 at %, and B: 6 at %, the others were the same as in embodiment 1, S/N ratio was measured with changing the thickness of the alloy film (NiP nitride film) 21 constituting the pre-coat layer into 30 Å to 2000 Å, and Table 1 and FIG. 2 were obtained.

TABLE 1

| NiP nitride film | S/N (dB) | |
|---|---|---|
| (film thickness Å) | Embodiment 2 | Embodiment 3 |
| 30 | 26.3 | 26.7 |
| 100 | 26.4 | 27.0 |
| 200 | 26.7 | 27.1 |
| 300 | 26.9 | 27.3 |
| 400 | 26.9 | 27.3 |
| 500 | 26.9 | 27.3 |
| 700 | 27.0 | 27.4 |
| 900 | 27.0 | 27.5 |
| 1300 | 27.0 | 27.8 |
| 1500 | 27.0 | 27.8 |
| 2000 | 27.0 | 27.8 | consequently, it is found that, although S/N ratio is improved with the film thickness of the NiP nitride film increasing, when it reaches a potential that the magnetic layer has, S/N ratio is saturated. That is, Table 1 and FIG. 2 shows that the film thickness that S/N ratio is saturated differs in accordance with characteristics that the magnetic layer has (the value of S/N ratio is saturated from the vicinity of 600 to 900 Å in case of the CoCrPtB magnetic layer of embodiment 2, and from the vicinity of 1300 Å in case of the CoCrPtTaB magnetic layer).

Embodiments 4 and 5

Figure 3:
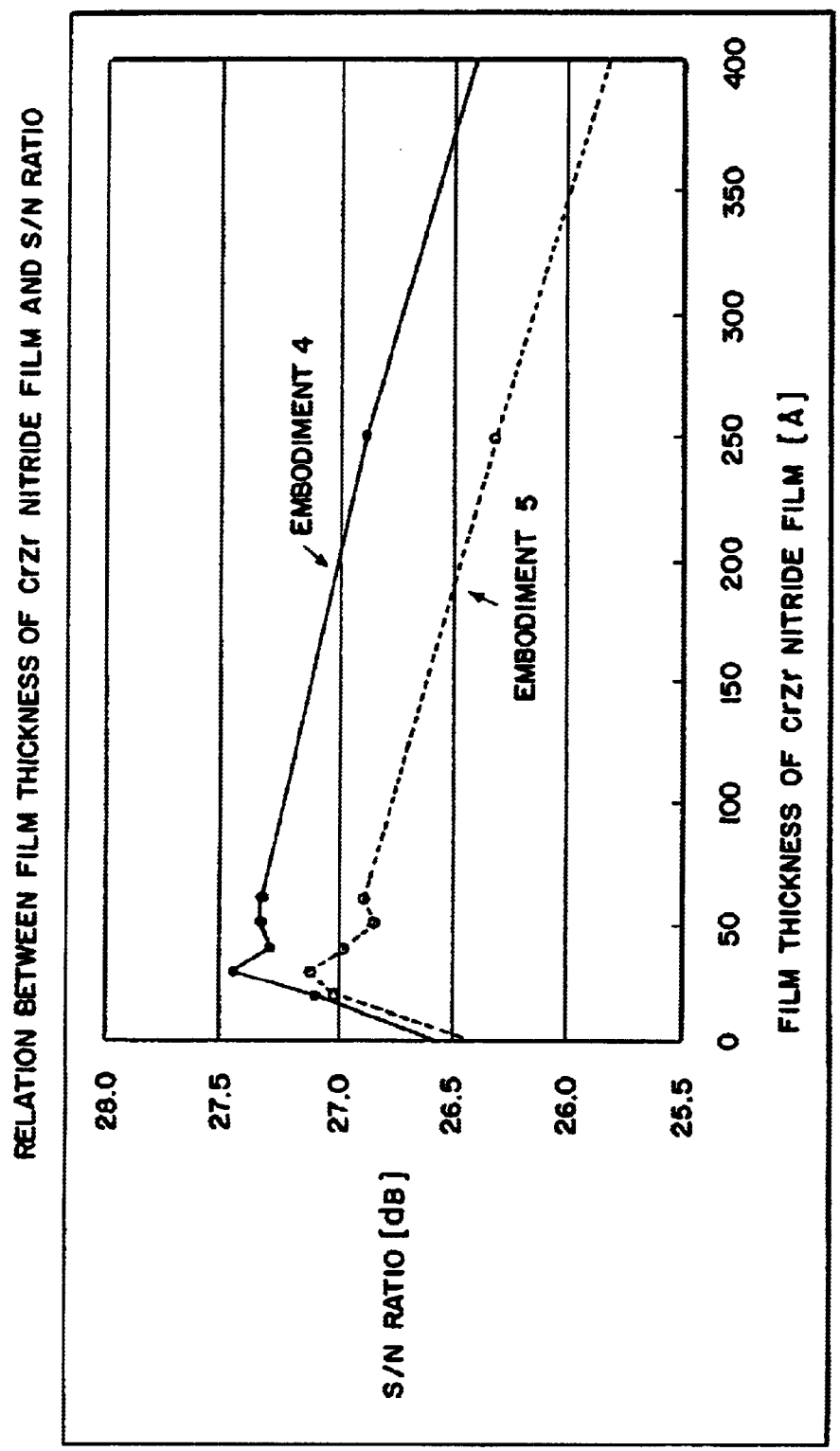
FIG. 3 is a graph showing the relation between the thickness of the upper layer of the pre-coat layer and S/N ratio.

Besides, S/N ratio was measured with changing the thickness of the alloy film (CrZr nitride film) constituting the pre-coat layer 2 into 20 to 400 Å, and Table 2 and FIG. 3 were obtained. Incidentally, as for the composition of the magnetic layer, it was used as embodiment 4 that the same alloy film as that of embodiment 2 was used, it was used as embodiment 5 that the same alloy film as that of embodiment 3 was used, and the others were the same as in embodiment 1 to manufacture a magnetic recording medium.

Consequently, it was found to have a peak of S/N ratio when the film thickness of the CrZr nitride film was 30 Å. Incidentally, this optimal value is irrespective of the material of the magnetic layer. This means that the film thickness in which the CrZr nitride film acts as a nucleus of the seed layer is before and after 30 Å, and shows that it is required to accurately control the film thickness of the CrZr nitride film.

In short, in the distribution of crystal grain diameter such as the seed layer formed on the pre-coat layer, in order that the dispersion is small (crystal grain diameters are uniform), it shows that it is required to accurately control the film thickness of the CrZr nitride film as the upper layer.

TABLE 2

| CrZr nitride film | S/N (dB) | |
|---|---|---|
| (film thickness Å) | Embodiment 4 | Embodiment 5 |
| 20 | 27.1 | 27.0 |
| 30 | 27.4 | 27.1 |
| 40 | 27.3 | 27.0 |
| 50 | 27.3 | 26.8 |
| 60 | 27.3 | 26.9 |
| 250 | 26.9 | 26.3 |
| 400 | 26.4 | 25.8 |

Embodiments 6 to 8

Figure 4:
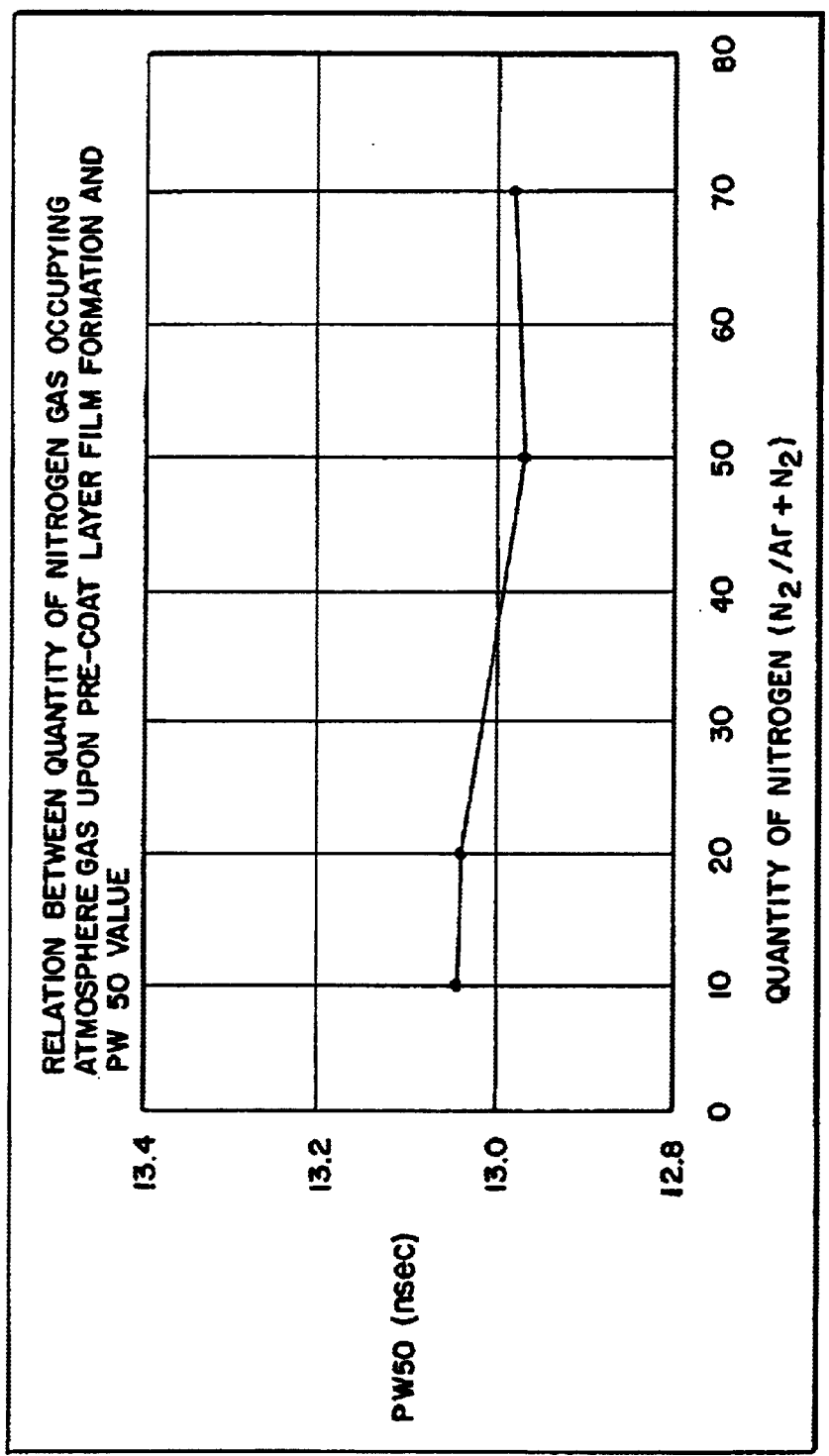
FIG. 4 is a graph showing the relation between $N_2$ gas content occupying an atmosphere gas upon pre-coat layer film formation and PW 50 value.
Figure 5:
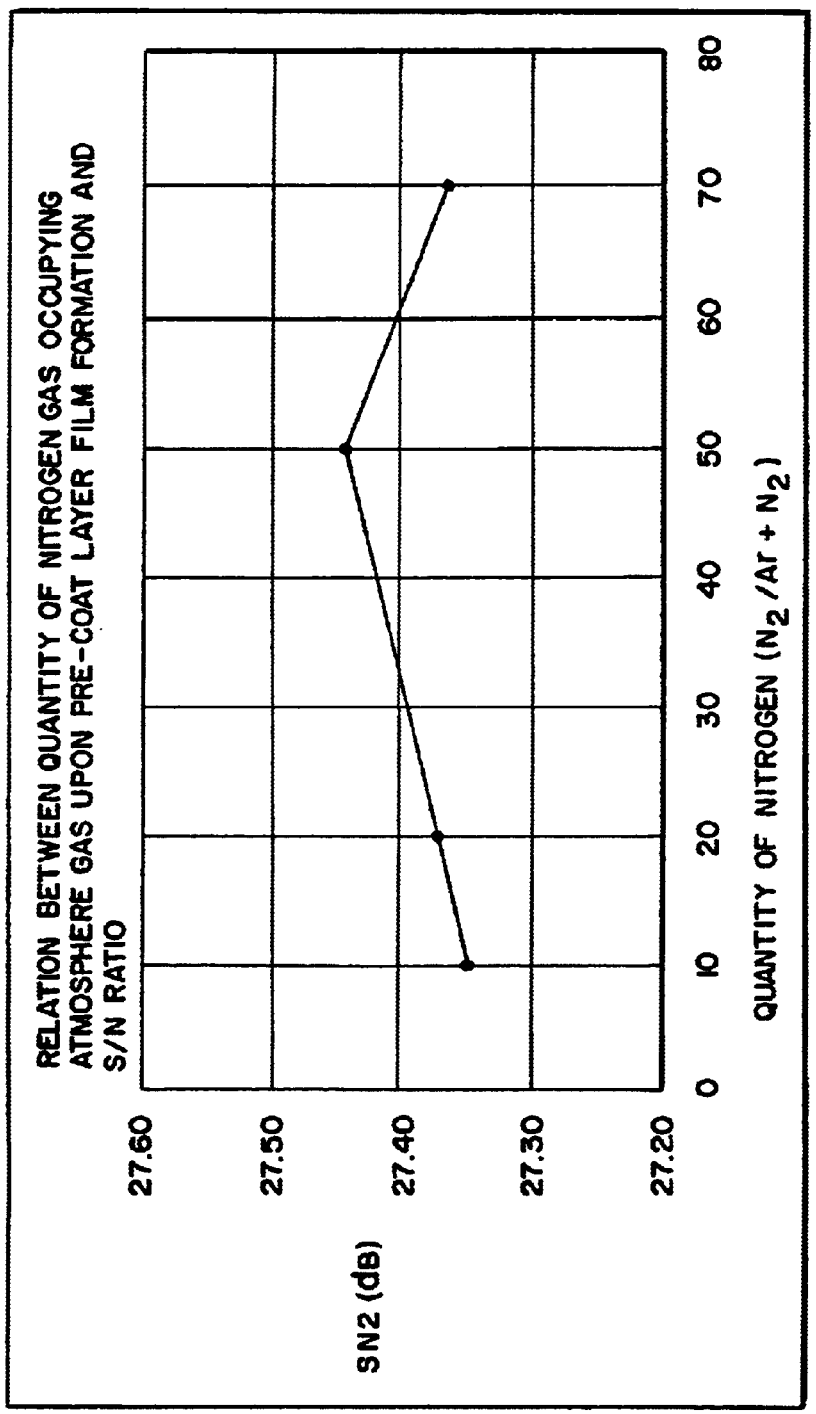
FIG. 5 is a graph showing the relation between $N_2$ gas content occupying the atmosphere gas upon pre-coat layer film formation and S/N ratio.

The quantity of $N_2$ gas occupying the atmosphere gas upon film formation of the pre-coat layer 2 was changed into 10% (embodiment 6), 20% (embodiment 7), 50% (embodiment 1), and 70% (embodiment 8), respectively, the others are the same as in embodiment 1, PW 50 values and S/N ratio were measured, and Table 3 and FIGS. 4 and 5 were obtained.

TABLE 3

| $N_2/(Ar + N_2)$ (%) | PW 50 (nsec) | S/N (dB) |
|---|---|---|
| 10 (Embodiment 6) | 13.04 | 27.35 |
| 20 (Embodiment 7) | 13.04 | 27.37 |
| 50 (Embodiment 1) | 12.97 | 27.44 |
| 70 (Embodiment 8) | 12.98 | 27.36 |

Consequently, it is found that either of PW 50 value and S/N ratio has the optimal point when the quantity of $N_2$ gas occupying the atmosphere gas upon film formation of the pre-coat layer 2 is 50%.

Embodiments 9 and 10 and Comparative Example 1, 2, and 3

Figure 6:
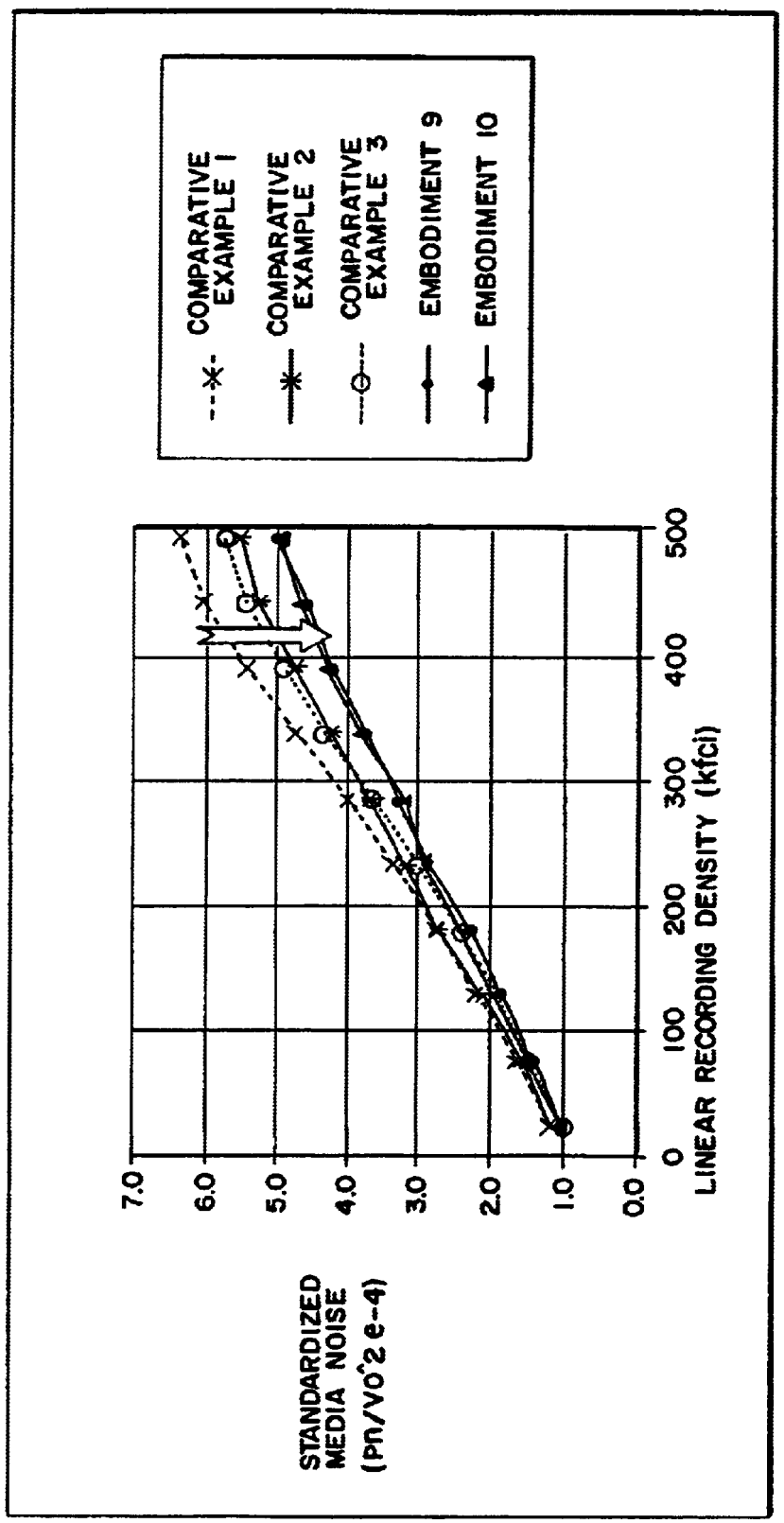
FIG. 6 is a graph showing the relation between the linear recording density and the standardized media noise.

Magnetic disks were manufactured respectively in case that no pre-coat layer is formed (comparative example 1, 2, and 3) and in case that the pre-coat layer is formed (embodiment 9 (the same except that the ratio of Cr to Zr of the upper layer of embodiment 1 was changed (Cr: 60 at %, Zr: 40 at %)), and embodiment 10 (the same except that the film thickness of the upper layer of embodiment 1 was changed into 50 Å), standardized media noise to linear recording density was measured, and the result of FIG. 6 was obtained.

Incidentally, the standardized media noise is standardized by LF (output) from that, when the output (LF) is large, noise is also large, and represented by $((noise)^2/(LF)^2)*10000$. The unit is $Pn/(Vo^2)*10000$ (Pn: noise power, Vo: output voltage). The measurement method was measured using a spectrum analyzer, and as for noise span, the measurement was performed at 0.6 to 98.76 MHz.

Incidentally, the film structures of the magnetic disks of comparative examples 1, 2, and 3 are as follows (/indicates sequential lamination. Besides, suffix of element symbol indicates atomic ratio (unit: at %)).

Comparative example 1: $Ni_{50}Al_{50}$ (film thickness: 350 Å)/$Cr_{90}W_{10}$ (film thickness: 10 Å)/$Ni_{50}Al_{50}$ (film thickness: 350 Å)/$Cr_{80}V_{20}$ (film thickness: 100 Å)/$Co_{65}Cr_{35}$ (film thickness: 30 Å)/$Co_{62}Cr_{20}Pt_{12}B_{6}$ (film thickness: 120 Å)/$Cr_{19}Mn_9C_2$ (film thickness: 30 Å)/$Co_{63.5}Cr_{20}Pt_{10}Ta_{0.5}B_6$ (film thickness: 120 Å)/hydrogenated carbon (film thickness: 45 Å)/perfluoropolyether (film thickness: 8 Å).

Comparative example 2: $(Ni_{50}Al_{50})N_2$ (film thickness: 350 Å)/$Cr_{90}W_{10}$ (film thickness: 10 Å)/$Ni_{50}Al_{50}$ (film thickness: 350 Å)/$Cr_{80}V_{20}$ (film thickness: 100 Å)/$(Co_{65}Cr_{35})O_{0.1}$ (film thickness: 30 Å)/$Co_{62}Cr_{20}Pt_{12}B_6$ (film thickness: 120 Å)/$Cr_{19}Mn_9C_2$ (film thickness: 30 Å)/$Co_{63.5}Cr_{20}Pt_{10}Ta_{0.5}B_6$ (film thickness: 120 Å)/hydrogenated carbon (film thickness: 45 Å)/perfluoropolyether (film thickness: 8 Å).

Comparative example 3: $Ni_{50}Al_{50}$ (film thickness: 400 Å)/$Cr_{80}V_{20}$(film thickness: 60 Å)/$Co_{65}Cr_{35}$ (film thickness: 15 Å)/$Co_{63.5}Cr_{20}Pt_{10}Ta0.5B_6$ (film thickness: 190 Å)/hydrogenated carbon (film thickness: 45 Å)/perfluoropolyether (film thickness: 8 Å).

Consequently, as shown in FIG. 6, comparing the characteristics of standardized media noise to linear recording density of the magnetic recording media of embodiments 9 and 10 and comparative examples 1, 2, and 3, as for the value of the standardized media noise at a relatively small (about 200 kfci) linear recording density, the difference between embodiments 9, 10 and comparative examples 1, 2, 3 was 0.5 [$Pn/Vo^{2}*e^{-4}$] at the maximum, but the value of the standardized media noise at a high linear recording density (300 kfci or more) was about 1.5 [$Pn/Vo^{2}*e^{-4}$] at the maximum between embodiments 9, 10 and comparative examples 1, 2, 3. This shows that the magnetic recording medium of the present invention is particularly effective at a high linear recording density (300 kfci or more) in particular.

As described above, according to the present invention, magnetic recording media in which S/N ratio is considerably improved at a high recording density can be realized.

What is claimed is:

1. A magnetic recording medium in which at least an underlayer and a magnetic layer are sequentially formed on a glass substrate, wherein a pre-coat layer for decrease in size of crystal grains of the underlayer and the magnetic layer and for suppressing dispersion of grain size of the underlayer and the magnetic layer contains nitrogen and is formed by sputtering between said glass substrate and the underlayer, and in said pre-coat layer, a lower layer containing Ni and P and an upper layer made of a Cr alloy are sequentially laminated from said glass substrate side.

2. The magnetic recording medium according to claim 1, wherein the crystal structure of said pre-coat layer is an amorphous structure or a substantially amorphous structure.

3. The magnetic recording medium according to claim 1, wherein said nitrogen is contained at 1 to 20%.

4. The magnetic recording medium according to claim 1, wherein said upper layer is a Cr alloy containing Cr and one of Zr and W.

5. The magnetic recording medium according to claim 1, wherein a seed layer for controlling the crystal grain diameter of the underlayer and magnetic layer is formed between said pre-coat layer and the underlayer.

6. The magnetic recording medium according to claim 1, wherein the film thickness of said lower layer is 50 to 2000 Å.

7. The magnetic recording medium according to claim 1, wherein the film thickness of said upper layer is 5 to 300 Å.

8. The magnetic recording medium according to claim 1, wherein said magnetic recording medium is used under conditions of a linear recording density of 300 kfci or more.

9. The magnetic recording medium according to claim 1, wherein said glass substrate is made of aluminosilicate glass.

* * * * *